United States Patent
Fisher

(10) Patent No.: US 9,534,156 B2
(45) Date of Patent: Jan. 3, 2017

(54) LINERLESS RECORD MATERIAL

(71) Applicant: APPVION, INC., Appleton, WI (US)

(72) Inventor: Mark Robert Fisher, Appleton, WI (US)

(73) Assignee: APPVION, INC., Appleton, WI (US)

( * ) Notice: Subject to any disclaimer, the term of this patent is extended or adjusted under 35 U.S.C. 154(b) by 30 days.

(21) Appl. No.: 14/488,829

(22) Filed: Sep. 17, 2014

(65) Prior Publication Data

US 2016/0075921 A1 Mar. 17, 2016

(51) Int. Cl.
| | |
|---|---|
| *B41M 5/26* | (2006.01) |
| *B41M 5/50* | (2006.01) |
| *G09F 3/10* | (2006.01) |
| *C09J 133/08* | (2006.01) |
| *C09D 133/08* | (2006.01) |
| *C08K 5/101* | (2006.01) |
| *B41M 5/42* | (2006.01) |
| *B41M 5/44* | (2006.01) |
| *G09F 3/02* | (2006.01) |

(52) U.S. Cl.
CPC .............. *C09J 133/08* (2013.01); *B41M 5/42* (2013.01); *B41M 5/504* (2013.01); *C08K 5/101* (2013.01); *C09D 133/08* (2013.01); *G09F 3/10* (2013.01); *B32B 2519/02* (2013.01); *B41M 5/44* (2013.01); *B41M 2205/04* (2013.01); *B41M 2205/36* (2013.01); *G09F 2003/0211* (2013.01); *Y10T 428/2817* (2015.01)

(58) Field of Classification Search
CPC ........... B41M 5/26; B41M 5/50; B41M 5/502; B41M 5/504; B41M 2205/36; G09F 3/10; G09F 2003/0211; G09F 2205/36; B32B 2519/02; Y10T 428/2817
USPC ...................... 503/200, 226; 428/32.22, 347
See application file for complete search history.

(56) References Cited

U.S. PATENT DOCUMENTS

| | | | |
|---|---|---|---|
| 5,336,541 A | 8/1994 | Kobayashi | |
| 5,431,763 A | 7/1995 | Bradshaw | |
| 5,508,247 A | 4/1996 | Tran et al. | |
| 5,569,515 A | 10/1996 | Rice et al. | |
| 5,578,352 A | 11/1996 | Smith | |
| 5,725,320 A | 3/1998 | Austin et al. | |
| 5,750,192 A | 5/1998 | Smith | |
| 5,773,386 A | 6/1998 | Langan | |
| 5,883,043 A * | 3/1999 | Halbrook, Jr. | ......... C09D 11/50 427/152 |
| 5,985,441 A | 11/1999 | Szczepaniec et al. | |
| 6,352,751 B1 | 3/2002 | Miles | |
| 6,379,764 B1 | 4/2002 | Pusateri et al. | |
| 6,773,539 B2 | 8/2004 | Mertens et al. | |
| 6,890,112 B2 | 5/2005 | Kline | |
| 7,329,449 B2 | 2/2008 | Wiklof | |
| 7,588,811 B2 | 9/2009 | Blank et al. | |
| 7,820,264 B2 | 10/2010 | Blank et al. | |
| 8,445,104 B2 | 5/2013 | Vigunas et al. | |
| 8,537,184 B2 | 9/2013 | Roth et al. | |
| 8,567,317 B2 | 10/2013 | Roth | |
| 2003/0117479 A1 | 6/2003 | Ichikawa et al. | |
| 2003/0223800 A1 | 12/2003 | Wiklof et al. | |
| 2004/0126530 A1 | 7/2004 | Finger | |
| 2004/0234756 A1 | 11/2004 | Mathiaparanam et al. | |
| 2004/0265573 A1 | 12/2004 | Morita et al. | |
| 2006/0159913 A1 | 7/2006 | Kugo et al. | |
| 2007/0267146 A1 | 11/2007 | Vigunas | |
| 2009/0169282 A1 | 7/2009 | Keeton | |
| 2009/0209419 A1 | 8/2009 | Kitano | |
| 2011/0205326 A1 | 8/2011 | Roth | |
| 2011/0311809 A1* | 12/2011 | Yamaguchi | ............ C09J 133/08 428/346 |
| 2012/0216951 A1 | 8/2012 | Kian et al. | |
| 2013/0133532 A1 | 5/2013 | Kian et al. | |
| 2013/0156986 A1 | 6/2013 | Nahm et al. | |
| 2013/0209681 A1 | 8/2013 | Roth | |
| 2013/0230672 A1 | 9/2013 | Vigunas et al. | |

(Continued)

FOREIGN PATENT DOCUMENTS

CA 2172238 12/1996

OTHER PUBLICATIONS

Gordon L. Robertson, "Food Packaging: Principles and Practice," 2013 [online] [retrieved on Nov. 3, 2015]. Retrieved from the Internet <URL:https://books.google.com/books?id=y27tL_7ZJFUC&printsec=frontcover&source=gbs_ge_sum#v=onepage&q&f=false> pp. 255-256.

*Primary Examiner* — Bruce H Hess
(74) *Attorney, Agent, or Firm* — Muncy, Geissler, Olds & Lowe, P.C.

(57) ABSTRACT

The invention describes a composition and method of providing an improved recording material, such as an ink receptive recording material or thermally responsive record material useful for linerless labels. The record material comprises a support having provided thereon on one surface an adhesive material, and on at least one other surface, an ink receptive coating or a heat sensitive imaging coating. The method comprises applying to a first surface a first layer of a coating of an ink receptive material or of a heat sensitive color-forming composition comprising a binder material and a substantially colorless dye precursor and an acidic developer material in substantially contiguous relationship. The adhesive is heat activated. The record material exhibits substantially no tack at 23° C., 40% relative humidity when pressure is applied, however develops high peel strength (300 grams/inch) upon application of 7 mJ/mm$^2$ to 13 mJ/mm$^2$ of heat energy.

16 Claims, No Drawings

(56) References Cited

U.S. PATENT DOCUMENTS

2013/0245174 A1 9/2013 Kian et al.
2013/0248103 A1 9/2013 Kian et al.

* cited by examiner

LINERLESS RECORD MATERIAL

BACKGROUND OF THE INVENTION

Field of the Invention

This invention relates to recording materials, particularly record materials having an ink receptive coating material or a thermally-responsive coating material. It more particularly relates to such record material in the form of sheets preferably coated with color-forming systems comprising chromogenic material (electron-donating dye precursors) and acidic color developer material, or such sheets having an ink receptive layer. The record materials are able to be used to record print-on-demand information.

This invention particularly relates to record material with an ink receptive coating or a thermally responsive record material in the form of linerless labels with an adhesive for bonding the label to another surface. The record material of the invention does not require a liner material and is useful for point-of-sale imaging, is particularly useful for thermally responsive record material, or point-of-sale printing.

This invention concerns a record material with an ink receptive coating, and alternatively, record materials where the ink receptive coating is thermally-responsive capable of forming a substantially non-reversible image and useful for producing functional bar codes, text, images or other indicia. The invention teaches compositions and methods for forming improved record materials, particularly thermally sensitive record materials which can be imaged without printhead debris, background discoloration, surface scuffing of the record material, dusting and other image defects.

Description of the Related Art

Record materials, particularly thermally responsive record materials are well known in the art and are described in many patents, for example. U.S. Pat. Nos. 3,539,375; 3,674,535; 3,746,675; 4,151,748; 4,181,771; 4,246,318; and 4,470,057 which are incorporated herein by reference. In these systems, basic colorless or lightly colored chromogenic material and acidic color developer material are contained in a coating on a substrate which, when heated to a suitable temperature, melts or softens to permit the color-forming materials to react, thereby producing a colored mark.

Thermally-responsive record materials have characteristic thermal response, desirably producing a colored image of sufficient intensity upon selective thermal exposure.

Thermally-responsive record materials are increasingly utilized for labels for recording variable information such as text, bar code imaging, graphics, alphanumeric characters and the like since such labels can be readily created by printer equipment in the field nearer the point of use and application.

Bar codes provide a convenient means for computerized inventory or goods handling and tracking. To function properly, it is necessary that the bar code have high print contrast signal, and that the thermally-responsive material on which the bar code is imaged resist unwanted bar width growth after imaging. The characters or bars must not only be intensely imaged, but must be sharp, and unbroken or free of pin holes. It is also necessary that when read by a scanner that a high percentage of scans result in successful decoding of the information in the bar code. The percentage of successful decodes of the bar code information must be maintained at a high value for the thermally-responsive record material to gain wide commercial acceptance for use in bar coding applications.

Print contrast signal relates to image intensity. Bar width growth relates to imaged bar dimensional stability and character sharpness. Percent decode relates to image integrity. Background contrast must also be maintained at a high level.

Use of recording sheets in the form of adhesive labels has grown, as interest in printing or imaging point of sole information has grown. Conventional labels typically have an adhesive on one surface for affixing, permanently or removably, the label onto another surface, object or package depending on the end use. Conventional labels typically reply on pressure sensitive adhesives, solvent or water activated adhesives, blocking agents, hot melt adhesives, or reactive adhesives.

To improve resource conservation, interest has grown in linerless labels which can eliminate a liner material often employed with tacky or pressure sensitive adhesives which protect the adhesive layer prior to the label application.

Keeton (U.S. 2009/0169282) describes a heat activated linerless label where one or more printheads can selectively heat activate specific adhesive portions of a label. A subcoat isolation layer is taught to avoid adverse interaction between chemicals and/or impurities of the paper with the thermally sensitive coating. Additionally, a top coat is taught optionally applied over the thermally-sensitive coating.

Keeton focuses on thermal transfer ribbons or direct thermal print means of forming media for two-sided thermal printers. Keeton suggests that a printable surface or imaging means can be on one side and a heat activated can be on the other side. The reference supports activation with a thermal print lead of a two-sided printer but fails to provide an example outlining the chemistry of the thermal system, the adhesive or the energy requirements to realize such a system. Keeton suggests that the thermally sensitive materials can image at a first temperature, and the heat activated adhesives can image at a second temperature. Keeton, however, does not provide a single compound in any example. Keeton generally states any type of adhesive may be applied, and generically lists water based acrylics, tacky acrylic resins in water, hot melt rubber based adhesives, but provides no specific example illustrating coating compositions identifying workable adhesives.

Matsubayashi et al., 2007/0092665 references Japanese Patent Application Second Publication No. Hei 4-15110 as describing a heat sensitive recording adhesive label with a release agent layer on the surface of a heat sensitive recording sheet which also relies on a blocking layer. Hei 4-15110 describes a heat sensitive color-developing sheet on which a polyvinyl alcohol blocking or protective undercoat layer is first applied. Over the blocking layer, or isolation layer, a solventless ultraviolet curing silicone of organopolysiloxanes with mercapto and vinyl groups along with acetophenone curing initiator is applied, followed by ultraviolet irradiation to form a release agent. An adhesive such as an acrylic emulsion adhesive is coated on the undercoat isolation or blocking layer on the opposite surface.

It would be an advance in the art of linerless record materials, particularly thermally responsive record materials and ink receptive coated record materials, if the need for an isolation, insulating, or blocking layer could be eliminated without interfering background discoloration of the heat sensitive recording sheet, or interference with the ink receptive coating, or other adverse interaction. Often the constituents of conventional heat sensitive release coats, especially curable release coats, for recording sheets adversely affect the heat sensitive layer interfering with image formation or resulting in a light or faded coloration of the image or background or in some cases no image at all. A need exists for a recording sheet especially a heat sensitive or ink receptive linerless label that does not need a blocking or isolating layers and that is substantially free of dust residues that could affect printhead and image quality, and which does not suffer from layer lift off, abrading or scuffing, yet produces a high contrast, high intensity image useful for imaging and/or bar coding for point-of-sale applications.

It would be an advance in the art of linerless print-on-demand record materials if they were paper-like, non-tacky prior to activation, yet adhering strongly following activation using the heat of a conventional thermal print head.

DESCRIPTION OF THE INVENTION

The present invention teaches an improved record material useful for linerless labels, the record material comprising a substrate having first and second surfaces and having provided thereon on at least a first surface, an ink receptive coating or a heat sensitive coating. The heat sensitive coating can comprise in one or more layers a substantially colorless dye precursor and an acidic developer material in substantially contiguous relationship. A binder material can also be included. Optionally, a release coating may be applied over the heat sensitive coating and may be in direct contact with the heat sensitive coating which can be formed of one or more layers. The release coating can comprise an aqueous mixture of a water soluble or water dispersible polymeric material, a release agent, preferably polysiloxane, and, a binder material. The heat sensitive coating upon being heated reacts with the dye precursor to develop color. The release coating, if employed, can be cured at a temperature of 160° C. or less, or even from 70° C. to 120° C. without visible background discoloration of the heat sensitive coating and to a scuff resistant hardness.

An the ink receptive coating can comprise a coating composition applied as one layer or as a combination of a top ink receptive layer and intermediate layer prepared by forming a fine dispersion of the component binder materials, fillers, surfactants, oil absorptive pigment, alkali or alkaline metal carbonates, and other additives in an aqueous coating medium.

Preferably the substrate sheet material is from 5 to 120 pounds per 3300 square foot ream, more preferably 5 to 90 pounds, and most preferably from 5 to 60 pounds.

The intermediate layer of the ink receptive coating can comprise from 0.1 or even from 10 to 60 weight percent of an oil absorptive pigment having an absorbance of at least 90 grams per square meter.

The ink receptive coating comprising top layer and intermediate layer can comprise in addition a binder material. The binder can be a polymeric material and is substantially vehicle soluble although latexes are also eligible in some instances. Preferred water soluble binders include polyvinyl alcohol, hydroxy ethylcellulose, methylcellulose, methylhydroxypropylcellulose, starch, styrene maleic anhydride salts, modified starches, gelatin and the like. Water soluble carboxylalkyl starch or carboxyalkyl celluloses are also eligible and can be included at from 0.1 to 20 percent by weight based on weight of the layer (dry weight basis). Eligible latex materials include polyacrylates, styrene-butadiene-rubber latexes, polyvinylacetates, polystyrene, and the like. The binder is used to protect the coated materials from brushing and handling forces. Binder should be present in an amount to afford such protection and in an amount less than will interfere with achieving reactive contact between color forming reactive materials or ink absorption. Polymeric binders such as polyvinyl alcohol, polyvinyl acetate, and polyacrylate can be optionally employed as a protective layer for special applications coated over the ink receptive or thermally imaging layer or layers, but is not required nor preferred.

Optionally the ink receptive coating is a porous ink receiving layer. The ink receiving layer can contain fine voids which receive and fix ink to form an image. The ink receiving layer is a coating composition comprising silica particles having an average particle diameter of from 50 to 1,000 nm. The coating composition can comprises dispersant and other components such as a binder resin, a surfactant, and cationic polymer. Examples of the silica include the Aerosil series of silicas produced by Nihon Aerosil Co., Ltd. Silicas made by gas phase processes or wet precipitation methods can be used individually or blended. Examples of silica produced by wet precipitation include Nipsil silicas produced by Nippon Silica Industrial Co., Ltd Silica produced by gas phase methods and the silica produced by wet precipitation methods can be dispersed in an aqueous medium together with a surfactant or a binder to prepare a coating composition. The mean diameter of the silica formed by such processes is generally from 50 to 1,000 nm. In addition to the binders previously mentioned, the binder can also optionally include hydrophilic polymers such as polyvinyl alcohol, polyvinylpyrrolidone, polyethylene oxide, polyacrylamide, sugars, gelatin and the like.

A cationic polymer is preferably contained in the ink receiving layer for helping fix the ink. The cationic polymer can be optionally be selected from various cationic polymers. The cationic polymer which may be used include a homopolymer of a monomer having a quaternary ammonium base or a copolymer of such the monomer and one or more polymerizable monomers. The polymer can have a weight average molecular weight of from 2,000 to 100,000. When a cationic polymer having a quaternary ammonium base is the copolymer, the ratio of the cationic monomer is preferably not less than 10 mole-%, more preferably not less than 20 mole-%, particularly preferably not less than 30 mole-%. If monomer having the quaternary ammonium is selected, it may be used solely or in combination. Cationic polymers having a quaternary ammonium base generally have high water solubility. Compounds prepared by hydrolysis and polycondensation of a silane coupling agent having a quaternary ammonium base structure can also be used as the cationic polymer.

Optionally, when the ink receptive layer is a combination of a top ink receptive layer and intermediate layer, the top layer can be from 0.01 to 6.0 gsm.

The intermediate layer comprises any of the above silicas or fumed silica alone or in combination, or can comprise from 0.5 to 60 weight percent of an oil absorptive pigment having an absorbance of at least 90 grams per square meter and in an alternate aspect at from 2 to 30 weight percent of an oil absorptive pigment. The intermediate layer is positioned between the top layer and the substrate sheet. The intermediate layer can comprises in addition a carboxyalkyl starch or carboxyalkyl cellulose at from 0.1 to 20 percent by weight based on the weight of the intermediate layer (dry weight basis).

The intermediate layer can be substantially similar in composition to the composition of the top layer, even identical. However in one embodiment, it is important that the layers be separately applied layers. Surprisingly, the interface between the two layers gives rise to a dye particle holding effect which the interface seems to augment, while the water phase seems to more easily transit the interface boundary.

In an alternative embodiment, the top layer and intermediate layer can be blended as one single ink receptive layer.

The components of the respective layers, the top layer and the intermediate layer are substantially insoluble in the dispersion vehicle (preferably water) and are ground to an individual average particle size of between about 1 micron to about 10 microns, preferably about 1-3 microns or less. The binder material is substantially vehicle soluble although latexes are also eligible in some instances. With ink receptive layers, the binder material is preferred to be carboxyalkyl starch or carboxyalkyl cellulose.

Coating weights of the respective, top layer and intermediate layer, can each be independently selected from about 0.01 to about 6 grams per square meter (gsm) and preferably about 0.5 to about 3.5 gsm. The combined coat weight of the two layers is from about 0.01 to 6 gsm, or even 0.25 to about 6 gsm, more preferably from 0.5 to 4.5 gsm.

In a further embodiment, the present invention teaches a thermally responsive record material useful for linerless labels, the record material comprising a support having first and second surface having provided on the first surface a heat sensitive coating comprising a substantially colorless dye precursor and an acidic develop material, and including in addition a binder material; a heat activated adhesive provided on a second surface of the support, the heat activated adhesive having substantially no tack at 23° C., 40% relative humidity with an instantaneous applied pressure of 55.9 grams per sq. centimeter over several minutes such as 7 minutes, or even one hour, the heat activated adhesive having a peel strength of at least 300 grams/inch (118 grams per cm) upon application of 7 mJ/mm$^2$ to 13 mJ/mm$^2$, or even to 16 mJ/mm$^2$ of heat energy.

In another embodiment, the thermally responsive record material includes heat activated adhesives applied at a coat weight of from 0.1 to 8 gsm. The heat activated adhesive can comprise an acrylate adhesive and a tackifier. The heat activated adhesive prior to activation, has a coefficient of static friction such as of 0.60 or less per Tappi T 549 0-08 or similar test. Optionally, the heat activated adhesive can be applied to only a portion of the second surface.

The invention describes a composition and method of providing an improved recording material such as thermally responsive record material or ink jet record material useful for linerless labels. The record material comprises a support having provided thereon on one surface an adhesive material, and on at least one other surface, an ink receiving layer or a heat sensitive imaging coating. The heat activated adhesive displays substantially no tack under load.

The tackifier functions as a modifier of the adhesive polymer. Tackifiers can be selected from materials such as polyterpen resins, stypenated terpenes, rosin esters, terpene phenolics, lydroealin resins, polyvinyl cyclohexane, poly(t-butyl styrene), rosin esters, glycerol esters of rosins, or penta erythritol esters of rosin. The tackifier helps to impart viscoelastic characteristics to the adhesive polymer.

The tackifier comprises from 15 to 65% or even from 15 to 50%, or in another aspect from 30 to 45% of the total adhesive composition by weight. The tackifier s have a softening point (ASTM method E28) above about 40° C., or in another aspect above about 65° C., or even from 65° C. to about 120° C. The adhesive comprises from 1 part to 6 parts tackifier, or in alternative aspects up to 30 parts by weight tackifier.

Optionally a plasticizing oil comprises from 0% to 4%, or even from 8% to 32% or even from 16 to 25%, or in another aspect from 17 to 22% by weight of the adhesive composition. Plasticizing oils include oils such as shellflex from Shell Oil Products, Houston, Tex.

At 23° C., 40% relative humidity with an applied pressure of 55.9 grams/square centimeter instantaneously or over a period of 7 minutes or even for one hour, substantially no tack is perceptible. Upon application of 7 mJ/mm$^2$ to 13 mJ/mm$^2$ of heat energy, the adhesive exhibits a peel strength of at least 300 grams/inch (118/grams/centimeter).

In a further embodiment the invention teaches an improved record material useful for linerless labels. The record material comprises a support having provided thereon a coating of an ink receiving layer or of a heat sensitive coating comprising a binder material and a first layer of a substantially colorless dye precursor and an acidic developer material in substantially contiguous relationship. Optionally, included in addition is a second layer overcoating the first layer and in direct contact with the heat sensitive coating. The second layer comprises a water soluble or water dispersible polymeric material, or release agent such as polysiloxane. The first layer upon being heated reacts with the dye precursor to develop color. Optionally, the second layer can at temperature of from 70° to 120° C. or even to 160° C. without visible background discoloration of the first layer.

The aqueous based release coating can be applied directly onto a thermally imaging coating or ink receptive coating useful for forming linerless record materials such as linerless labels which are thermally imaging or ink receptive.

In a yet further embodiment, the present invention provides an improved record material useful for linerless label applications. In one embodiment, the present invention teaches a thermally responsive record material useful for label applications. The record material can have a heat sensitive coating or ink receiving coating on one surface of a support. On the second surface of the support material a heat activated adhesive is provided having a static coefficient of friction of less than 0.60 or less.

Table 1 illustrates reported coefficients of friction of common materials.

|  | Static |
| --- | --- |
| aluminum on aluminum | 1.35 |
| iron on iron | 1.10 |
| iron on copper | 1.05 |
| glass on glass | 0.94 |
| steel on ice | 0.03 |
| steel on copper | 0.53 |
| 50# bond | 0.55 |
| 24# bond | 0.31 |

The thermally imaging labels of the invention with a heat sensitive coating on one surface and a heat actiable adhesive on the second surface can display a coefficient of friction (static) of 0.60 or less using test methods such as Tappi T549 (see for example Tappi T-549 om-08.)

Such coefficient of friction reflects the fact that the record materials of the invention display substantially no tack. The feel of a label fashioned from this record material can be similar to conventional paper with no perceptible tack. The materials do not block when compressed such as when a weight is applied or the substrate wound tightly in a large roll. The composition of the invention is a printable label or direct thermal adhesive label stock with no perceptible tack when instantaneous pressure is applied, or even when weighted at 82.5 grams per square inch over 7 minutes or less. The thermally imagining label surprisingly can develop a rapid peel strength of at least 300 grams/inch upon application of 7 mJ/mm$^2$ to 16 mJ/mm$^2$ of heat energy.

Linerless construction optionally can involve a separator layer, reflective layer, insulating layer, or prime coat or isolation layer. Such an additional layer (or layers) is optional but in such embodiment could be employed as additional assurance to reduce heat transfer to the opposite surface with either the heat sensitive adhesive which is heat activated, or the heat sensitive imaging coating which is also a heat sensitive layer. Hollow spheres for example, can be used as a reflective or insulating layer between the support and the heat sensitive coating, or ink receptive coating, or between the support and the adhesive layer. Such a reflective layer, insulating layer, hollow sphere layer, prime coat layer or isolation layer can be positioned as a barrier or intermediate layer between the surface and any of the heat sensitive coating, ink receptive coating, or heat activated adhesive.

The heat actiable adhesive not only displays a low coefficient of static friction, but also substantial peel strength upon activation with from 7 mJ/mm$^2$ to 16 mJ/mm$^2$ of heat energy.

The heat activatable adhesive is a film forming acrylic polymer latex emulsion. A commonly available latex that can be employed is acrylic latex emulsion by BASF Joncryl 74-A.

The adhesive layer can be aqueous or latex based, and may be applied wet, and allowed to dry. Other film-forming water based acrylics may be used. In the water based acrylics, water is a carrier that dries to leave the adhesive resin. The adhesives can for example include acrylate polymers with a glass transition temperature Tg>50° C. in combination with amorphous polyurethane or polyurethane-polyurea polymers with a glass transition temperature Tg<+10° C. such as taught in US Publication 20130143010, incorporated herein by reference. In alternative embodiments, adhesives can be applied in a heat softened form and then cooled, potentially to a solid. Water based adhesives are preferred.

The adhesive layer can comprises in addition a plasticizer and tackifier. Upon heating, the open time of the adhesive can be controlled by adjusting a ratio of the components, including the adhesive monomers, the plasticizer, and tackifier to achieve the desired coefficient of friction. The preferred activation for the adhesive layer is preferably within the range of from about 50° C. to about 120° C. but more particularly activation upon application of 7 to 16 mJ/mm$^2$ of heat energy. Adhesive systems of this type are described in detail in US Publication 20130133532, incorporated herein by reference.

With an activatable linerless label adhesive, the properties of adhesion and viscosity change at an activation temperature. Therefore, the adhesive can be thermally switched to a tacky state. If such adhesive system is coated on the surface of a substrate at a temperature below the designed switch temperature, the adhesive material can be in its non-tack solid state. This permits a label construction of a substrate which can be wound in a roll form, and useful for a linerless application. During use, such as applying a label substrate to a surface, upon activation the adhesive material rapidly changes to a tacky state and then exhibit its peel strength adhesive properties, which allows an activatable linerless label to be adhered to a substrate as desired as a result of increased adhesion properties The adhesive can be selected by way of illustration and without limitation from one or more film-forming emulsions of lower alkyl acrylates, styrene, methyl methacrylate, methacrylic acid, acrylic acid, one or more multifunctional monomers, and one or more chain transfer agents. A wide array of alkyl acrylates can be used singly or in combination to form the adhesive. For example, methyl acrylate, butyl acrylate, ethyl acrylate, and 2-ethylhexyl acrylate could be used. Styrene and styrene based materials can also be used in combination.

A wide array of monomers or multifunctional monomers can be used for the adhesive layer of the present invention. Multifunctional monomers can also be used to achieve cross-linking of the adhesive monomers. Representative examples of such multifunctional monomers include, but are not limited to, difunctional monomers, trifunctional monomers, and multifunctional monomers having more than three active functional sites. Useful examples of difunctional monomers include, but are not limited to 1,4-butanediol diacrylate, polyethylene glycol diacrylate, and combinations thereof. Another preferred difunctional monomer is ethylene glycol dimethacrylate. Trifunctional monomers include, but are not limited to ethoxylated trimethylolpropane triacrylate, propoxylated glycerol triacrylate, and combinations thereof. Preferred examples of multifunctional monomers having more than three active functional sites include, but are not limited to, ethoxylated pentaerythritol tetraacrylate, and combinations thereof. These and numerous other suitable multifunctional monomers are commercially available from various suppliers such as Sartomer Company, Inc. of Exton, Pa.

Optionally, the adhesive layer can comprise chain transfer agents to form activatable adhesives. These are typically used at concentrations of from about 0 to about 5.0%, and preferably from about 1.0% to about 4.0% (percentages are based upon the total weight of monomer and chain transfer agent). Representative examples of suitable chain transfer agents include, but are not limited to, n-dodecyl mercaptan, tert-nonyl mercaptan, isooctyl 3-mercaptopropionate, and combinations thereof. Suitable chain transfer agents are available commercially such as from Sigma Aldrich of St. Louis, Mo. The adhesive for example can comprise one or more monomers and one or more chain transfer agents.

Methods of applying adhesives include flood coating an entire surface of a substrate or selectively coating an area of the surface. Alternatively, the adhesives could comprise a dry film that is heat-activated to become tacky. The dry film may be applied to a surface of the substrate as a wet adhesive. An example of a wet adhesive is a water based acrylic adhesive. Methods of applying the dry film include covering an entire surface of a substrate with the dry film or selectively covering an area of the surface. Optionally, a heat seal layer, insulating layer, hollow sphere layer, or reflective layer can be included between the adhesive layers and the substrate. The heat seal layer can even include a clay coating or a variety of resins. A heat seal layer can prevent heat applied to one surface from being transferred to the opposing surface of the substrate.

The adhesives can be modified to provide varying degrees of "tack", i.e., stickiness or strength of adherence, for the labels. As examples, the tack of an adhesive can be varied by modifying the adhesive's chemical composition, shape, size, and thickness. With some types of adhesives, the strength of adherence varies with the amount of adhesive applied. The adhesive's tack also can be varied by selectively activating different patterns on the adhesive. The adhesives can for example include acrylate polymers with a glass transition temperature Tg>50° C. and amorphous polyurethane or polyurethane-polyurea polymers with a glass transition temperature Tg<+10° C. such as taught in US Publication 20130143010, incorporated herein by reference.

An optional release coating can include a heat curable silicone release agent or a polysiloxane release agent. Materials of this type are available commercially such as Silforce silicone emulsions (Momentive Performance Materials, Albany, N.Y.) or Silcolease silicone emulsions (Bluestar Silicones, East Brunswick, N.J.). The release agent can include a UV or heat curable release agent comprising silicone or polysiloxane. Griswold et al., U.S. Pat. No. 6,077,611 incorporate by reference, describes aqueous silicone release emulsions useful as a release agent for forming the release coating of the invention. These comprise condensation curable and addition curable silicone emulsions with a polymeric material such as an aqueous polyurethane emulsion. These types of release coats can be cured to a linerless release coating. The release agent can comprise polysiloxane polymer such as an alkenyl substituted polysiloxane, and a hydride functional cross-linking silicone such as a methyl hydrogen siloxane polymer, or methyl hydrogen polysiloxane, silanol stopped polysiloxane, and various organosiloxanes.

The polymeric material of the release coating can comprise among other polymers, and by way of illustration and not limitation, polyurethanes, reaction products of polyisocyanates, polydiisocyanates, polyisocyanurates, cycloaliphatic polyisocyanates, aromatic polyisocyanates, with various polyols and polyether polyols. Exemplary polymeric material of the release coating can include reaction products of various polyisocyanates or isocyanurates with various polyols or polyether polyols. For example the polyisocyanates can comprise polyisocyanate having at least two isocyanate (—NCO) functionalities per molecule, such as diisocyanate monomers or oligomers, aliphatic polyisocyanates such as 1,6-hexamethylene diisocyanate, and isocyanurate-containing derivatives; cycloaliphatic polyisocyanates such as 4,4'-methylene bis(cyclohexyl isocyanate), cyclohexane 1,4-diisocyanate and isocyanurate derivatives; aromatic polyisocyanates such as 4,4'-diphenylmethane diisocyanate, xylyene diisocyanate, toluene diisocyanate, isophorone diisocyanate, 1,5-naphthalene diisocyanate, 4,4',4''-triphenylmethane diisocyanate, and its isocyanurate-containing derivatives. Mixtures or the reaction products of polyisocyanates can be used. Polyisocyanates containing the reaction products of diisocyanate including isocyanurate, urea, allophanate, biuret, carbodimide, and uretonimine entities can also be used. The foregoing can be reacted with various polyols such as polyols having at least two hydroxy functionalities per molecule and a molecular weight ranging from 250 to 5000 g/mole. The polyol may be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone may also be used.

Polyether polyols useful for the polyurethane reaction for the polymeric material of the release coating include products obtained by the polymerization of a cyclic oxide including ethylene oxide, propylene oxide or tetrahydrofuran, or mixtures thereof. Polyether polyols include poly-oxypropylene, polyols, polyoxyethylene, polyols, poly(oxyethylene-co-oxypropylene)polyols, polyoxytetramethylene, polyols.

Polycarbonate polyols useful for the polyurethane reaction for the polymeric material of the release coating include reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cyclo aliphatic diols, both of PPG Industries.

The record material according to the invention has a non-reversible image in that it is non-reversible under the action of heat. The coating of the record material of the invention is basically a dewatered solid at ambient temperature.

The color-forming system of the record material when a thermally imaging coating is employed comprise electron one or more donating dye precursors, also known as chromogenic material, in their substantially colorless state together with an acidic developer material. The color-forming system relies upon melting, softening, or subliming one or more of the components to achieve reactive, color-producing contact with the chromogen. Substantially colorless for purposes of the invention is understood to mean colorless or lightly or faintly colored.

The invention is functional with various fluorans and leuco dye precursors, including 2-anilino-3-methyl-6-dibutylaminofluoran, including the various crystalline or recrystallized forms such as .alpha. or .beta.

The record material includes a substrate or support material which is generally in sheet form. For purposes of this invention, sheets can be referred to as support members and are understood to also mean webs, ribbons, tapes, belts, films, cards and the like. Sheets denote articles having two large surface dimension and a comparative small thickness dimension. The substrate or support material can be opaque, transparent or translucent and could, itself, be colored or not. The material can be fibrous including, for example, preferably paper and filamentous synthetic materials and combinations with papers and films. It can also be a film including, for example, cellophane and synthetic polymeric sheets cast, extruded, or otherwise formed. Neutral sized base paper has been used in thermally-imaged record systems and is a preferred substrate. However, various kinds and types of substrates, and combinations can be selected in various embodiments.

The components of the heat sensitive coating are in substantially contiguous relationship, substantially homogeneously distributed throughout the coated layer or layers deposited on the substrate. For purposes of this invention the term substantially contiguous is understood to mean that the color-forming components are positioned in sufficient proximity such that upon melting, softening or subliming one or more of the components, a reactive color-forming contact between the components is achieved. As is readily apparent to the person of ordinary skill in this art, these reactive components can be in one layer or can be positioned in separate layers using multiple layers. In other words, one component, such as colorformer, can be positioned in a first layer, and coreactive or modifier components positioned in a subsequent layer or layers. All such arrangements are understood herein as being substantially contiguous, and intended as included in the term heat sensitive coating.

The acidic developer to dye precursor ratio by weight is preferably maintained at from 1:1 to about 2:1. The modifier to dye precursor ratio by weight is preferably maintained at from 0.3:1, to about 1:1, or even greater than 1:1.

In manufacturing the record material, a coating composition is prepared which includes a fine dispersion of the components of the color-forming system, and binder material, preferably polymeric binder such as polyvinyl alcohol.

The heat-sensitive coating composition can additionally contain pigments, such as clay, talc, silicon dioxide, aluminum hydroxide, calcined kaolin clay and calcium carbonate, and urea-formaldehyde resin pigments at from 0 to 30%, or even 0 to 15% by weight of the heat-sensitive coating. Other optional materials include natural waxes, Carnauba wax, synthetic waxes, lubricants such as zinc stearate; wetting agents; defoamers, other modifiers and antioxidants. The modifier typically does not impart any image on its own but as a relatively low melt point solid, acts as a solvent to facilitate reaction between the mark-forming components of the color-forming system. Optionally though not preferred in the invention due to interference with heat transfer as described above, the thermally-sensitive record material can be top coated with a polymeric coating such as polyvinyl alcohol.

The color-forming system components are substantially insoluble in the dispersion vehicle (preferably water) and are ground to an individual average particle size of less than 10 microns, preferably less than 3 microns or smaller. The polymeric binder material is substantially vehicle soluble although latexes are also eligible in some instances. Preferred water soluble binders, which can also be used as topcoats, include polyvinyl alcohol, hydroxyl ethylcellulose, methylcellulose, methyl-hydroxypropylcellulose, starch, modified starches, gelatin and the like. Eligible latex materials include polyacrylates, styrene-butadiene, rubber latexes, polyvinylacetates, polystyrene, and the like. The polymeric binder is used to protect the coated materials from brushing and handling forces occasioned by storage and use of thermal sheets. Binder should be present in an amount to afford such protection and in an amount less than will interfere with achieving reactive contact between color-forming reactive materials.

Coating weights can effectively be about 0.1 to about 9 grams per square meter (gsm), or even from 1 to about 9 gsm, or even from 3 to about 9 gsm and preferably about 5 to 6 gsm. The practical amount of color-forming materials is controlled by economic considerations, functional parameters and desired handling characteristics of the coated sheets.

Electron-donating dye precursors or chromogens include chromogenic compounds such as the phthalide, leucoauramine and fluoran compounds. These chromogenic materials or electron donating dye precursors are well known color-forming compounds for use in color-forming record systems. Examples of the compounds include Crystal Violet Lactone (3,3-bis(4-dimethylaminophenyl)-6-dimethylaminophthalide), (U.S. Pat. No. RE 23,024); phenyl-, indolyl, pyrrolyl, and carbazolyl-substituted phthalides (for example, in U.S. Pat. Nos. 3,491,111; 3,491,112; 3,491,116; 3,509, 174); nitro-, amino-, amido-, sulfonamide-, aminobenzylidene-, halo-, aniline-substituted fluorans (for example, the U.S. Pat. Nos. 3,624,107; 3,641,011; 3,642,828; 3,681, 390); spirodipyrans (U.S. Pat. No. 3,971,808); and pyridine and pyrazine compounds (for example, in U.S. Pat. Nos. 3,775,424 and 3,853,869). Other specifically eligible chromogenic compounds, not limiting the invention in any way are: 3-diethylamino-6-methyl-7-anilino-flouran (U.S. Pat. No. 4,510,513); 3-dibutylamino-6-methyl-7-anilino-fluoram; 3-dibutylamino-7-(2-chloroanilino) fluoran; 3-(N-ethyl-N-tetrahydrofurfurylamino)-6-methyl-7-3,5'6-tris(dimethylamino)spiro[9H-fluorene-9,1'(3'H)-isobenzofuran]-3'-one; 7-(1-ethyl-2-methylidole-3-yl)-7-(4-diethylamino-2-ethoxyphenyl)-5,7-dihydrofuro[3,4-b]pyridine-5-one (U.S. Pat. No. 4,246,318); 3-diethylamino-7-(2-chloroanilino) fluoran (U.S. Pat. No. 3,920,510); 3-(N-methylcyclohexylamino)-6-methyl-7-anilinofluoran (U.S. Pat. No. 3,959, 571); 7-(1-octyl-2-methylindole-3-yl)-7-(4-diethylamino-2-ethoxyphenyl)-5,7-dihydrofuro]3,4-b]pyridine-5-one; 3-diethylamino-7,8-benzofluoran; 3,3-bis(1-ethyl-2-methylidole-3-yl)phthalide; 3-diethylamino-7-enilinofluoran; 3-diethylamino-7-benzylaminofluoran; 3'-phenyl-7-dibenzylamino-2,2'-spirodi-[2H-1-benzopyran] and mixtures of any of the following.

Acidic developer materials can include the compounds listed in U.S. Pat. No. 3,539,375 as phenolic reactive material, particularly the monophenols and diphenols. Acidic developer materials also include, the following compounds: 4,4'-isopropylidinediphenol (Bisphenol A); p-hydroxybenzaldehyde; p-hydroxybenzophenone; p-hydroxypropiophenone; 2,4-dihydroxybenzophenone; 1,1-bis(4-hydroxyphenyl)cyclohexane; salcyanilide; 4-hydroxy-2-methylacetophenone; 2-acetylbenzoic acid; m-hydroxyacetanilide; p-hydroxyacetanilide; 2,4-dihydroxyacetophenone; 4-hydroxy-4'-methylbenzophenone; 4,4'-dihydroxybenzophenone; 2,2-bis(4-hydroxyphenyl)-4-methylpentane; benzyl 4-hydroxyphenyl ketone; 2,2-bis(4-hydroxyphenyl)-5-methylhexane; ethyl-4, 4-bis(4-hydroxyphenyl)-pentanoate; isopropyl-4,4-bis(4-hydroxyphenyl)pentanoate; methyl-4,4-bis(4-hydroxyphenyl)pentanoate; alkyl-4,4-bis(4-hydroxyphenyl)pentanoate; 3,3-bis(4-hydroxyphenyl)(-pentane; 4,4-bis(4-hydroxyphenyl)-heptane; 2,2-bis(4-hydroxyphenyl)-1-phenylpropane; 2,2-bis(4-hydroxyphenyl)butane; 2,2'-methylene-bis(4-ethyl-6-tertiarybutyl phenol); 4-hydroxycoumarin; 7-hydroxy-4-methylcoumarin; 2,2'-methylene-bis(4-octyl phenol); 4,4'-sulfonyldiphenol; 4,4'-thiobis(6-tertiarybutyl-m-cresol); methyl-p-hydroxybenzoate; n-propyl-p-hydroxybenzoate; benzyl-p-hydroxybenzoate, and bis(4-hydroxy-3-allylphenyl sulphone).

Examples of other developer compounds include phenolic novolak resins which are the product of reaction between, for example, formaldehyde and a phenol such as an alkylphenol, e.g., p-octylphenol, or other phenols such as p-phenylphenol, and the like; and acid mineral materials including colloidal silica, kaolin, bentonite, aftapulgite, hallosyte, and the like. Some of the polymers and minerals do not melt but undergo color reaction on fusion of the chromogen.

Optionally, modifiers can also be included. These modifiers for example, can include acetoacetyl-o-toluidide, phenyl-1-hydroxy-2-maphthoate, 1,2-diphenoxyethane, and p-benzylbiphenyl. Optionally, though not preferred, the record material can be topcoated or use subcoats such as insulating layers or hollow spheres. The color-forming system components are substantially insoluble in the dispersion vehicle (preferably water) and are ground to an individual average particle size of between about 1 micron to about 10 microns, preferably about 1-3 microns or less. The polymeric binder material is substantially vehicle soluble although latexes are also eligible in some instances. Preferred water soluble binders include polyvinyl alcohol, hydroxyethylcellulose, methylcellulose, methyl(hydroxypropyl) cellulose, starch, modified starches, gelatin and the like. Eligible latex materials include polyacrylates, styrene-butadiene-rubber latexes, polyvinylacetates, polystyrene, and the like. The polymeric binder is used to protect the coated materials from brushing and handling forces occasioned by storage and use of thermal sheets. Binder should be present in an amount to afford such protection in an amount less than will interfere with achieving reactive contact between color-forming reactive materials.

If desired, submicron, nano-like particulates and suspension of the components of the invention can be employed and manufactured through several techniques. One technique can involve crystal precipitation. In this technique crystals are grown dissolved in solvent. A non-solvent is added to course precipitation or crystallization. Alternative techniques rely on milling or wet milling to achieve submicron particles. With these techniques the crystals are intentionally fractured and comminuted to particles smaller than the crystal size of initial formation, which varies from material to material. As sizes decrease, various effects not seen with larger particulates are expressed, most notability more intense image density.

Small particulates can be produced by aerosol methods, or chemical mechanical grinding. This may entail a ball mill, rod mill, SAG mill, autogenous mill, pebble mill or other means of grinding or comminuting to submicron sizes. In some embodiments the material may be subjected to one or more heating steps during grinding. It is contemplated that grinding or comminuting can be conducted under ambient conditions, under an inert gas, or at elevated temperature or even in the presence of a liquid chemical agent to facilitate small particle formation. The optional liquid medium can include a solvent, surfactant, or lubricant.

Formation of nano type or nano-like particles can involve physical and chemical methods. Physical methods include, for example, electrospray, ultrasound, spray drying, superior fluid, solvent/anti-solvent crystallization and cryogenic technology. Electrospraying is disclosed in U.S. Pat. No. 3,208,951; ultrasound techniques are disclosed in U.S. Pat. No. 5,389,379 and supercritical carbon dioxide methods are disclosed in U.S. Pat. No. 5,639,441, U.S. Pat. No. 6,095,134 and U.S. Pat. No. 6,630,121; spray drying using compressed air is disclosed in U.S. Pat. No. 6,582,285 and U.S. Pat. No. 6,431,478. In addition, emulsion polymerization, interface polymerization and coagulation/phase separation can be used to fabricate nanoparticles. The above patents are incorporated herein to the extent that they provide exemplary, procedural or other details supplementary to those set forth herein.

All patents, test procedures, and other documents cited herein, including priority documents, are fully incorporated by reference to the extent such disclosure is not inconsistent with this invention and for all jurisdictions in which such incorporation is permitted.

The thermally-responsive sheets were made by making a coating dispersion. The dispersion was applied to a support with a wire wound rod and dried. Other materials such as fillers, antioxidants, lubricants and waxes can be added to the dispersion if desired. The sheets may be calendered to improve smoothness.

The following examples are given to illustrate some of the features of the present invention and should not be considered as limiting. In these examples all parts or proportions are by weight and all measurements are in the metric system, unless otherwise stated.

In all examples illustrating the present invention a dispersion of a particular system component can be prepared by milling the component in an aqueous solution of the binder until a particle size of less than 10 microns is achieved. The milling was accomplished in an attritor or other suitable milling device. The desired average particle size was less than 3 microns in each dispersion.

The thermally-responsive sheets were made by making separate dispersions of chromogenic material, modifier material, and developer material. The dispersions are mixed in the desired ratios and applied to a support with a wire wound rod and dried. Other materials such as fillers, antioxidants, lubricants and waxes can be added if desired. The sheets may be calendered to improve smoothness.

The thermal performance of the sheet can be measured by imaging the sheet on a dynamic thermal tester, such as an Atlantek Thermal Response Tester, Model 200. The thermal testing unit images the sheet with a constant cycle time, and a sequentially increasing dot pulse duration resulting in a series of thermal images of increasing intensity. The thermal images can be measured using a MacBeth RD-922 densitometer. The densitometer is calibrated such that 0.05 indicates pure white and 1.79 a fully saturated black image.

A MacBeth densitometer can be used to measure the properties of thermal recording material. In certain circumstances this instrument by itself may not capture all the necessary information needed to assess a thermal recording material. Such a test is useful for determining background. The following additional tests can also be informative: PCS (print contrast signal), BWG (bar width growth), % Decode (percentage of the scans which will result in a successful decoding of the information in the bar code), and the background (the relative darkness of the unimaged area). The invention exhibits excellent properties as a thermal recording material for producing functional images, including bar codes. The invention enables an improved thermally responsive record material in terms of PCS intensity, BWG, % Decode and whiteness of background.

A LaserCheck II scanner and verifier of Symbol Technologies conveniently can be used to measure print contrast signal, change in bar width growth, percent decode and background.

In certain applications, the use of a MacBeth densitometer measurement alone can be insufficient in ascertaining suitability of a thermal recording material, such as for bar code applications. The densitometer measures image density, but in a bar code application, a dense image could nonetheless be deficient. Characters or character edges may be fuzzy or indistinct. Pinholes could exist in otherwise dense solid areas and similar defects all can make an otherwise dense image unsuitable for bar code applications, despite a high MacBeth reading.

The addition of tests such as PCS, BWG and % Decode can provide a more accurate screening for suitability for bar code applications.

The following bar code related tests are conveniently measured with a LaserCheck II scanner and verifier. (Standardize LaserCheck II scanner and verifier unit to 0.90 PCS ratio.)

% Decode is a measure of the average probability that a single scan of a bar code would result in a successful decode or translation. In a well designed bar code system, that probability is desired to approach 100%.

PCS or print contrast signal is a measurement of the contrast or brightness difference between the bars and spaces of a bar code. A threshold PCS value is needed for a bar code to be scannable. PCS=(RL−RD)/RL; where RL is the reflectance of the background and RD is the reflectance of the dark bars.

BWG is the average deviation of bars from nominal widths over the entire symbol. The thickness of the bar is measured from the edge closest to the start character to the trailing edge of the same bar.

The following tests can be useful to assess a thermally imaging record material.

Test Methods

Test procedure: Samples are imaged on Hobart 18VP printer. Cut into individual samples with each sample bearing a complete bar code.

Water test: Imaged samples are placed into 100 ml beakers that contain distilled water. Each beaker is able to hold two samples. The bar codes should not contact each other. The bar code should be completely immersed. Restain samples in the water for 24 hours at room temperature. Then, remove from the water and allow to air dry for not less than four hours and not more than 24 hours. Read and record with LaserChek II scanner and bar code verifier. The PCS, BWG, % Decode and background are measured.

70° C. Cup Humidity Test: This method can be used for determining the physical resistance of samples to environmental humidity exposures at 70° C. The following materials are used in conducting this test: Hobart 18 VP printer or equivalent; LaserChek II scanner and verifier; test samples two 9/16" (CD.times.11" (MD)); 1000 ml beaker; 1000 ml beaker cover; oven maintained at 70° C.

Image bar code on samples using Hobart printer. Adjust voltage to 1.2 watts/dot. Cut strip into individual labels. Each label should have a complete bar code.

Imaged samples are secured inside of a 1000 ml beaker containing 250 ml of water. The labels should not be contacting the water directly. The lid is placed on the beaker and the beaker is placed in the 70° C. oven for 24 hours. The labels are removed from the beaker and allowed to air dry for not less than 1 hour or more than 24 hours. Read image with LaserCheck II scanner and verifier.

The PCS, PWG, % Decode and background are measured.

40° C./90% RH: cut two samples of the paper to be tested to 4½ CD.times.7"MD. Cut an approximate 1" diameter circle from center of sample. Place samples suspended apart in a 40° C.-90% relative humidity chamber. Maintain temperature and humidity at 40° C. (104° F.) dry bulb and 90% RH (100° F.) wet bulb. After exactly 48 hours, remove samples, and cool. Record original background and background after exposure. Calculate and record the percentage change in background decline using the following formula: Original Background—Exposed Background times 100 Original Background The PCS, BWG, Decode and background are conveniently measured with a LaserChek II scanner and verifier of Symbol Technologies. A MacBeth densitometer can also be used for background measurement.

Wet PVC-Room Temperature. Four imaged labels are immersed in distilled water for five seconds. Immediately wrap the wet label in plastic film as described in the 40° C. PVC test. Place the wrapped labels between two hard, flat surfaces and under a 7 lb. weight. Store at ambient room temperature for 24 hours. Then, unwrap the labels and let them air dry. Read and record with LaserChek II scanner and verifier. The print contrast signal (PCS) bar width growth (BWG), and percent decode (% Decode) is measured with the LaserChek II scanner and verifier of Symbol Technologies.

40° C. PVC Resistance. Imaged samples are covered with at least three layers of Borden PVC film on both sides. Make sure that the film is free of wrinkles and foldovers. Place the wrapped samples between two hard, flat surfaces with 3.5 kg weight on top to ensure good contact between the plastic film and the printed label. Store in 40° C. oven for 24 hours, unwrap the labels and read with LaserChek II scanner and verifier. The print contrast signal (PCS), bar width growth (BWG) and percent decode (% Decode) is measured with the LaserChek II scanner and verifier.

Alcohol Resistance. Imaged samples are placed into 100 ml beakers that contain 20% by weight isopropyl alcohol. Each beaker is able to hold two samples. The bar code samples should not contact each other. The bar codes should be completely immersed. Retain sample in alcohol for two hours at room temperature. Then, remove samples from the alcohol and allow to air dry for 24 hours. Read and record with LaserChek II scanner and verifier. The PCS, BWG and % Decode are measured with the LaserChek II scanner and verifier of Symbol Technologies.

Oil Resistance. Imaged samples are placed on a flat surface and tamped (???) to the surface. Pour Crisco vegetable oil on paper toweling. Coat sample with a thin film of oil with toweling. Distribute oil evenly so that there are no "puddles." Store at room temperature for 24 hours. After 24 hours wipe off excess oil. Read and record with LaserChek II. The PCS, BWG and % Decode measured with the LaserChek II scanner and verifier of Symbol Technologies.

The following examples are given to illustrate some of the features of the present invention and should not be considered as limiting. In these examples all parts or proportions are by weight and all measurements are in the metric system, unless otherwise stated.

| | Parts |
|---|---|
| Dispersion A - Plasticizer | |
| Dicyclohexyl Phthalate | 37.0 |
| Defoaming and dispersing agents | 5.0 |
| Water | 58.0 |
| Dispersion B - Binder | |
| Acrylic Resin @48% solids in water (JONCRYL 74A by BASF) | 100.0 |
| Dispersion C - Tackifier | |
| Rosin Ester (SYLVARES TP7042 by Arizona Chemical) Softening Point 147 C. | 40.0 |
| Defoaming and dispersing agents | 5.5 |
| Water | 54.5 |

Dispersion B2—Binder material is SBR latex @ 50% in water

Dispersion C1—Tackifier is Rosin Ester (SYLVARES TP2040 by Arizona Chemical) Softening Point 118C Dispersion C2—Tackifier is Rosin Ester (PENTALYN G by Pinova Inc.)

| Coating Formulation 1 | Parts |
|---|---|
| Dispersion A (Plasticizer) | 71.0 |
| Dispersion B (Binder) | 12.0 |
| Dispersion C (Tackifier) | 17.0 |

EXAMPLE 1

Coating Formulation 1 Using
Dispersion A Dicyclohexyl Phthalate
Dispersion B Acrylic Resin @48% solids in water (JONCRYL 74A by BASF)
Dispersion C Rosin Ester (SYLVARES TP7042 by Arizona Chemical)

COMPARATIVE EXAMPLE 1A

Coating Formulation 1 Using
Dispersion A Dicyclohexyl Phthalate
Dispersion B Acrylic Resin @48% solids in water (JON-CRYL 74A by BASF)
Dispersion C1 Rosin Ester (SYLVARES TP2040 by Arizona Chemical)

COMPARATIVE EXAMPLE 1B

Coating Formulation 1 Using
Dispersion A Dicyclohexyl Phthalate
Dispersion B Acrylic Resin @48% solids in water (JON-CRYL 74A by BASF)
Dispersion C2 Rosin Ester (PENTALYN G by Pinova Inc.)

EXAMPLE 2

Coating Formulation 1 Using
Dispersion A Dicyclohexyl Phthalate
Dispersion B2 Binder material is SBR latex @ 50% in water
Dispersion C Rosin Ester (SYLVARES TP7042 by Arizona Chemical)

| Coating Formulation 2 | Parts |
|---|---|
| Dispersion A (Plasticizer) | 51.0 |
| Dispersion B (Binder) | 12.0 |
| Dispersion C (Tackifier) | 37.0 |

EXAMPLE 3

Coating Formulation 2 Using
Dispersion A Dicyclohexyl Phthalate
Dispersion B Acrylic Resin @48% solids in water (JON-CRYL 74A by BASF)
Dispersion C Rosin Ester (SYLVARES TP7042 by Arizona Chemical)

| Coating Formulation 3 | Parts |
|---|---|
| Dispersion A (Plasticizer) | 51.0 |
| Dispersion B (Binder) | 32.0 |
| Dispersion C (Tackifier) | 17.0 |

EXAMPLE 4

Coating Formulation 3 Using
Dispersion A Dicyclohexyl Phthalate
Dispersion B Acrylic Resin @48% solids in water (JON-CRYL 74A by BASF)
Dispersion C Rosin Ester (SYLVARES TP7042 by Arizona Chemical)

| Coating Formulation 3 | Parts |
|---|---|
| Dispersion A (Plasticizer) | 34.5 |
| Dispersion B (Binder) | 43.1 |
| Dispersion C (Tackifier) | 22.4 |

COMPARATIVE EXAMPLE 2

Coating Formulation 1 Using
Dispersion A Dicyclohexyl Phthalate
Dispersion B2 Binder material is SBR latex @ 50% in water
Dispersion C Rosin Ester (SYLVARES TP7042 by Arizona Chemical)

The above examples were coated on the backside of a direct thermal paper at a weight of 7.5 g/m2.

To measure the amount of peel and at what energy it takes to develop said peel strength, samples of non-activated adhesive were activated using an Atlantek 400. This is a std test equipment used to measure direct thermal image development at different energies. Since the purpose is to have proper peel strength using a std direct thermal printer, this seemed to appropriate. Using the medium energy condition, samples were exposed to dynamic energies from 4.64 mJ/mm2 to 16 mJ/mm2. Upon activation, the activated adhesive side was placed against coated paper and against PPE film using a roller weighing 5 lbs. The sample was then tested for peel using a TMI Lab Master Release & Adhesion tester Model 80-91 at condition 300 in per minute, 90 degrees peel. The results are in the following tables. As a reference Scotch tape 810 was used. The values recorded are in g/in.

TABLE 1

| Energy mJ/mm2 | Example 1 | Comp. Ex 1A | Comp. Ex 1B | Example 2 | Example 3 | Example 4 | Comp. Ex 2 |
|---|---|---|---|---|---|---|---|
| Adhesive to Coated Paper (g/in) | | | | | | | |
| 16 | 400 | 160 | 170 | 300 | 280 | 280 | 0 |
| 14.58 | 420 | 140 | 130 | 300 | 270 | 270 | 0 |
| 13.16 | 420 | 80 | 80 | 310 | 260 | 240 | 0 |
| 11.74 | 430 | 60 | 40 | 270 | 220 | 220 | 0 |
| 10.32 | 440 | 40 | 30 | 260 | 180 | 170 | 0 |
| 8.9 | 410 | 30 | 20 | 270 | 130 | 100 | 0 |
| 7.48 | 300 | 0 | 0 | 270 | 70 | 30 | 0 |
| 6.06 | 170 | 0 | 0 | 80 | 10 | 0 | 0 |
| 4.64 | 0 | 0 | 0 | 0 | 0 | 0 | 0 |
| Adhesive to Coated Paper (g/cm) | | | | | | | |
| 16 | 157 | 62.9 | 66.9 | 118 | 110 | 110 | 0 |
| 14.58 | 165 | 55.1 | 51.2 | 118 | 106 | 106 | 0 |
| 13.16 | 165 | 31.4 | 31.5 | 122 | 102 | 94.5 | 0 |

TABLE 1-continued

| Energy mJ/mm2 | Example 1 | Comp. Ex 1A | Comp. Ex 1B | Example 2 | Example 3 | Example 4 | Comp. Ex 2 |
|---|---|---|---|---|---|---|---|
| 11.74 | 169 | 23.6 | 15.7 | 106 | 86.6 | 86.6 | 0 |
| 10.72 | 173 | 15.7 | 11.8 | 102 | 70.9 | 66.9 | 0 |
| 8.9 | 161 | 11.8 | 7.9 | 106 | 51.2 | 394 | 0 |
| 7.48 | 118 | 0 | 0 | 106 | 22.6 | 11.8 | 0 |
| 6.06 | 66.9 | 0 | 0 | 31.5 | 3.93 | 0 | 0 |
| 4.64 | 0 | 0 | 0 | 0 | 0 | 0 | 0 |

Reference Scotch 810: 320

TABLE 2

| Energy mJ/mm2 | Example 1 | Comp. Ex 1A | Comp. Ex 1B | Example 2 | Example 3 | Example 4 | Comp. Ex 2 |
|---|---|---|---|---|---|---|---|
| Adhesive to PPE film (g/in) | | | | | | | |
| 16 | N/A* | 280 | 270 | N/A* | N/A* | N/A* | 10 |
| 14.58 | N/A* | 170 | 170 | N/A* | N/A* | N/A* | 0 |
| 13.16 | N/A* | 130 | 80 | N/A* | N/A* | N/A* | 0 |
| 11.74 | N/A* | 80 | 40 | N/A* | N/A* | N/A* | 0 |
| 10.32 | N/A* | 30 | 0 | N/A* | N/A* | N/A* | 0 |
| 8.9 | 740 | 20 | 0 | 700 | 430 | 550 | 0 |
| 7.48 | 520 | 10 | 0 | 630 | 550 | 550 | 0 |
| 6.06 | 240 | 0 | 0 | 340 | 280 | 280 | 0 |
| 4.64 | 30 | 0 | 0 | 130 | 70 | 70 | 0 |
| Adhesive to PPE film (g/cm) | | | | | | | |
| 16 | N/A* | 110 | 106 | N/A* | N/A* | N/A* | 0 |
| 14.58 | N/A* | 66.9 | 66.9 | N/A* | N/A* | N/A* | 0 |
| 13.16 | N/A* | 51.2 | 31.5 | N/A* | N/A* | N/A* | 0 |
| 11.77 | N/A* | 31.5 | 15.7 | N/A* | N/A* | N/A* | 0 |
| 10.32 | N/A* | 11.8 | 0 | N/A* | N/A* | N/A* | 0 |
| 8.9 | 291 | 7.87 | 0 | 276 | 169 | 217 | 0 |
| 7.48 | 205 | 3.93 | 0 | 248 | 217 | 217 | 0 |
| 6.06 | 94.4 | 0 | 0 | 134 | 110 | 110 | 0 |
| 4.64 | 11.8 | 0 | 0 | 51.2 | 27.6 | 27.6 | 0 |

Reference Scotch 810: 500;
Note:
N/A* paper tore

From the tables it is evident that the examples develop adhesive strength similar to tape and developed strength at relatively low energies, allowing a wide variety of printer conditions. The comparative examples either built low adhesive strength at extremely high energy conditions, or not at all.

Samples were tested for lack of tack in the un-activated state. To be a practicable product, the material must have minimum tack under roll shipping and storage conditions.

To check for the stability of the adhesive under small roll conditions used by the end user, a series of test were run. Samples were cut into 3"×3" squares and stacked in groups of 3 per example. Each stacked example was placed under a 4"×10" block of a weight of 3.3 kgs., (0.36 kg/sq inch; 55.9 g/sq·cm) for at least one hour.

Examples were tested at room temperature conditions of 23° C. and humidity of 40%.

Examples were tested in a humidity chamber at 40° C./90% Relative Humidity (RH).

Examples were tested in oven at 40° C.

Results are in the following table 3

TABLE 3

| | 23° C. 40% RH | 40° C. 90% RH | 40° C. |
|---|---|---|---|
| Example 1 | 0 | 0 | 0 |
| Comp. Ex 1A | 0 | 2 | 2 |
| Comp. Ex 1B | 0 | 2 | 1 |
| Example 2 | 0 | 1 | 1 |
| Example 3 | 0 | 2 | 1 |
| Example 4 | 0 | 1 | 1 |
| Comp. Ex 2 | 0 | 1 | 1 |

0 no blocking
1 slight: minor sticking
2 severe: samples bonded to each other

| | Parts |
|---|---|
| Dispersion A - Plasticizer | |
| Dicyclohexyl Phthalate | 37.0 |
| Defoaming and dispersing agents | 5.0 |
| Water | 58.0 |
| Dispersion B - Binder | |
| Acrylic Resin @48% solids in water (JONCRYL 74A by BASF) | 100.0 |
| Dispersion C - Tackifier | |

-continued

| | Parts |
|---|---|
| Rosin Ester (SYLVARES TP7042 by Arizona Chemical) Softening Point 147 C. | 40.0 |
| Defoaming and dispersing agents | 5.5 |
| Water | 54.5 |

Dispersion B2—Binder material is SBR latex @ 50% in water
Dispersion C1—Tackifier is Rosin Ester (SYLVARES TP2040 by Arizona Chemical) Softening Point 118C
Dispersion C2—Tackifier is Rosin Ester (PENTALYN G by Pinova Inc.)

| Coating Formulation 1 | Parts |
|---|---|
| Dispersion A (Plasticizer) | 71.0 |
| Dispersion B (Binder) | 12.0 |
| Dispersion C (Tackifier) | 17.0 |

EXAMPLE 1

Coating Formulation 1 Using
Dispersion A Dicyclohexyl Phthalate
Dispersion B Acrylic Resin @48% solids in water (JONCRYL 74A by BASF)
Dispersion C Rosin Ester (SYLVARES TP7042 by Arizona Chemical)

COMPARATIVE EXAMPLE 1A

Coating Formulation 1 Using
Dispersion A Dicyclohexyl Phthalate
Dispersion B Acrylic Resin @48% solids in water (JONCRYL 74A by BASF)
Dispersion C1 Rosin Ester (SYLVARES TP2040 by Arizona Chemical)

COMPARATIVE EXAMPLE 1B

Coating Formulation 1 Using
Dispersion A Dicyclohexyl Phthalate
Dispersion B Acrylic Resin @48% solids in water (JONCRYL 74A by BASF)
Dispersion C2 Rosin Ester (PENTALYN G by Pinova Inc.)

EXAMPLE 2

Coating Formulation 1 Using
Dispersion A Dicyclohexyl Phthalate
Dispersion B2 Binder material is SBR latex @ 50% in water
Dispersion C Rosin Ester (SYLVARES TP7042 by Arizona Chemical)

| Coating Formulation 2 | Parts |
|---|---|
| Dispersion A (Plasticizer) | 51.0 |
| Dispersion B (Binder) | 12.0 |
| Dispersion C (Tackifier) | 37.0 |

EXAMPLE 3

Coating Formulation 2 Using
Dispersion A Dicyclohexyl Phthalate
Dispersion B Acrylic Resin @48% solids in water (JONCRYL 74A by BASF)
Dispersion C Rosin Ester (SYLVARES TP7042 by Arizona Chemical)

| Coating Formulation 3 | Parts |
|---|---|
| Dispersion A (Plasticizer) | 51.0 |
| Dispersion B (Binder) | 32.0 |
| Dispersion C (Tackifier) | 17.0 |

EXAMPLE 4

Coating Formulation 3 Using
Dispersion A Dicyclohexyl Phthalate
Dispersion B Acrylic Resin @48% solids in water (JONCRYL 74A by BASF)
Dispersion C Rosin Ester (SYLVARES TP7042 by Arizona Chemical)

| Coating Formulation 3 | Parts |
|---|---|
| Dispersion A (Plasticizer) | 34.5 |
| Dispersion B (Binder) | 43.1 |
| Dispersion C (Tackifier) | 22.4 |

COMPARATIVE EXAMPLE 2

Coating Formulation 1 Using
Dispersion A Dicyclohexyl Phthalate
Dispersion B2 Binder material is SBR latex @ 50% in water
Dispersion C Rosin Ester (SYLVARES TP7042 by Arizona Chemical)

The above examples were coated on the backside of a direct thermal paper at a weight of 7.5 g/m2.

To measure the amount of peel and at what energy it takes to develop peel strength, samples of non-activated adhesive were activated using an Atlantek 400. This equipment is used to measure direct thermal image development at different energies. The invention teaches a record material demonstrating peel strength using a standard direct thermal printer. Using the medium energy condition, samples were exposed to dynamic energies from 4.64 mJ/mm2 to 16 mJ/mm2. Upon activation, the activated adhesive side was placed against coated paper and against PPE film using a roller weighing 5 lbs. The sample was then tested for peel using a TMI Lab Master Release & Adhesion tester Model 80-91 at condition 300 in per minute, 90 degrees peel. The results are shown in the tables. As a reference Scotch tape 810 was used. The values recorded are in g/in.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims.

What is claimed is:

1. A record material useful for linerless labels, the record material comprising:
   i). a support having first and second surfaces;
   ii). a heat activated adhesive containing a tackifier provided on one surface of the support, the heat activated adhesive having substantially no tack at 23° C., 40% relative humidity with an applied pressure of 55.9 g/cm2 however, the heat activated adhesive having a peel strength of at least 300 grams/inch upon application of from 7 mJ/mm2 to 13 mJ/mm2 of heat energy and a tackifier softening point of 145-151° C.

2. The record material according to claim 1 wherein the first surface of the support has an ink receptive coating applied to the first surface of the support.

3. The record material according to claim 2 wherein the record material includes in addition a polymeric top coat.

4. The record material according to claim 1 wherein the record material is a thermally responsive record material and having provided on at least one surface of the support, a heat sensitive coating comprising a substantially colorless dye precursor and an acidic develop material, and including in addition a binder material.

5. The thermally responsive record material according to claim 4 wherein the heat activated adhesive is applied at a coat weight of from 0.1 to 8 gsm.

6. The thermally responsive record material according to claim 4 wherein the heat activated adhesive comprises an acrylate adhesive and the tackifier.

7. The thermally responsive record material according to claim 4 wherein the heat activated adhesive prior to activation has a coefficient of static friction of 0.60 or less per Tappi T549.

8. The thermally responsive record material according to claim 4 wherein the heat activated adhesive is applied to only a portion of the second surface.

9. The record material according to claim 4 wherein the record material includes in addition a polymeric top coat.

10. The thermally responsive record material according to claim 9 wherein the top coat is receptive to inks.

11. The thermally responsive record material according to claim 4 wherein the substantially colorless dye precursor comprises a fluoran compound.

12. The thermally responsive record material according to claim 4 wherein the heat sensitive composition is applied onto the support at from 0.5 to 8 gsm.

13. The record material according to claim 4 including an additional layer on a surface of the support, comprising a reflective layer, insulating layer, hollow sphere layer, or isolation layer positioned between the surface and either of the heat sensitive coating or heat activated adhesive.

14. The record material according to claim 1 wherein the support is paper or film.

15. The record material according to claim 1 wherein the support is a paper with a basis weight of 150 grams per sq. meter or less, or film.

16. The record material according to claim 1 wherein the adhesive is selected from alkyl acrylate, multifunctional acrylate, polyurethane, or an activatable adhesive comprising a chain transfer agent.

* * * * *